United States Patent [19]
Speck et al.

[11] Patent Number: 6,025,004
[45] Date of Patent: Feb. 15, 2000

[54] PROCESS FOR MECHANICALLY CONTROLLING THE BULK DENSITY OF AN EXTRUDED FOOD MATERIAL

[75] Inventors: Donald R. Speck, Festus; Alfred H. Mirman, St. Louis, both of Mo.

[73] Assignee: Ralston Purina Company, St. Louis, Mo.

[21] Appl. No.: 08/887,037

[22] Filed: Jul. 2, 1997

[51] Int. Cl.$^7$ .................................................. A23P 1/00
[52] U.S. Cl. .......................................... 426/516; 426/448
[58] Field of Search .................................. 426/516, 447, 426/448; 425/382.4

[56] References Cited

U.S. PATENT DOCUMENTS

| | | | |
|---|---|---|---|
| 3,561,371 | 2/1971 | Kummer | 425/188 |
| 3,680,994 | 8/1972 | Longenecker | 425/188 |
| 5,500,239 | 3/1996 | Hayward | 426/516 |
| 5,622,744 | 4/1997 | Matson et al. | 426/448 |

OTHER PUBLICATIONS

John Parnaby, et al.; Development of Computer Control Strategies for Plastic Extruders*; Aug., 1975; Polymer Engineering and Science; vol. 15, No. 8; pp. 594–605.

Llewellyn W. Bezanson, et al.; "Identification and Digital Adaptive Control of A Single Screw Extruder"; 1985; Control and Computers, vol. 13, No. 1; pp. 25–29.

M. H. Costin, et al.; "A Critical Review of Dynamic Modeling and Control of Plasticating Extruders"; May, 1982; Polymer Engineering and Science; vol. 22, No. 7; pp. 393–301.

M. Le Maguer, et al.; "Food Engineering and Process Applications"; Elsevier Applied Science Publishers; vol. 2; pp. 100–114.

Robert C. Miller; "Effect of Wear on Twin–Screw Extruder Performance"; Feb., 1984; Food Technology; pp. 56–61.

Dr. W. Wiedmann, et al.; "Cost efficiencies are realized by extrusion automation"; Nov., 1987; Food Engineering; pp. 117–118.

Dr. W. Widemann, et al.; "How to Automate An Extruder"; Apr., 1987; Food Engineering Int'l.; pp. 40–47.

A variable restrictive valve as an extra independent control variable for food extrusion processes, S. Schonauer and R. Moreira, Food Science and Technology International, pp. 241–248 (1996).

*Primary Examiner*—George C. Yeung
*Attorney, Agent, or Firm*—Herzog, Crebs & McGhee, LLP

[57] ABSTRACT

An adjustable variable flow restriction element and an extruder containing the same are provided for mechanically controlling the bulk density of an extruded material. The adjustable flow restriction element is located in an extruder proximate to the die of the extruder in position to partially block the downstream flow of material through the extruder. The adjustable flow restriction element is structured to be capable of assuming one of a plurality of uniquely flow restrictive positions, where the degree of restriction of flow controls the bulk density of an extruded material. A method of mechanically controlling the bulk density of an extruded material by restricting the flow of the material through an extruder is also provided.

11 Claims, 4 Drawing Sheets

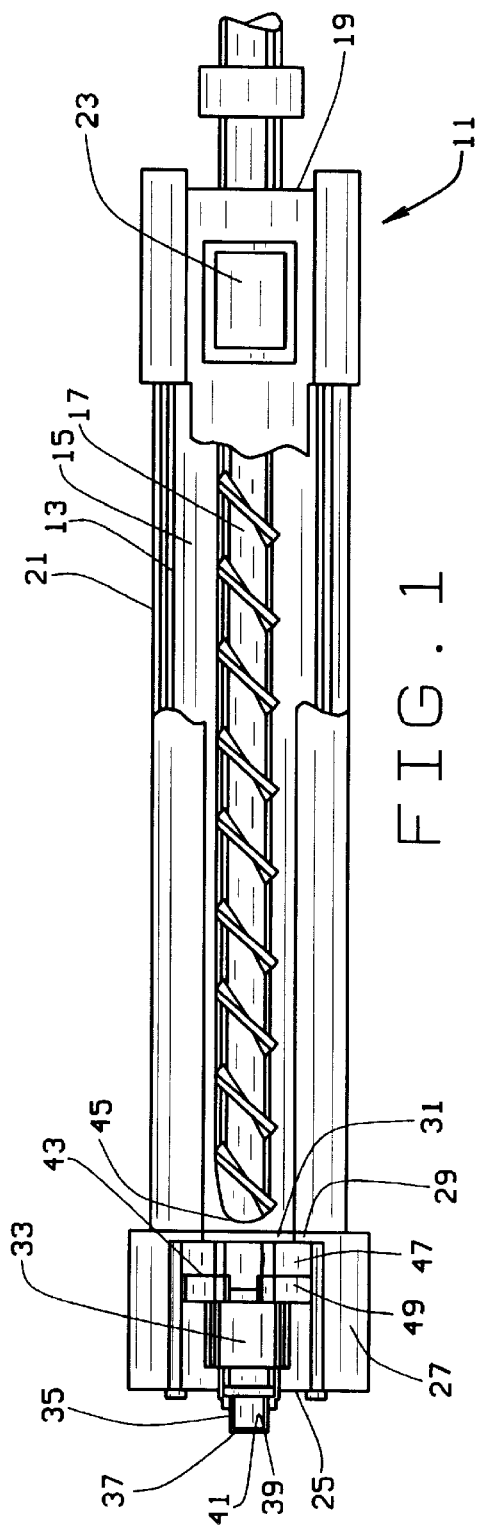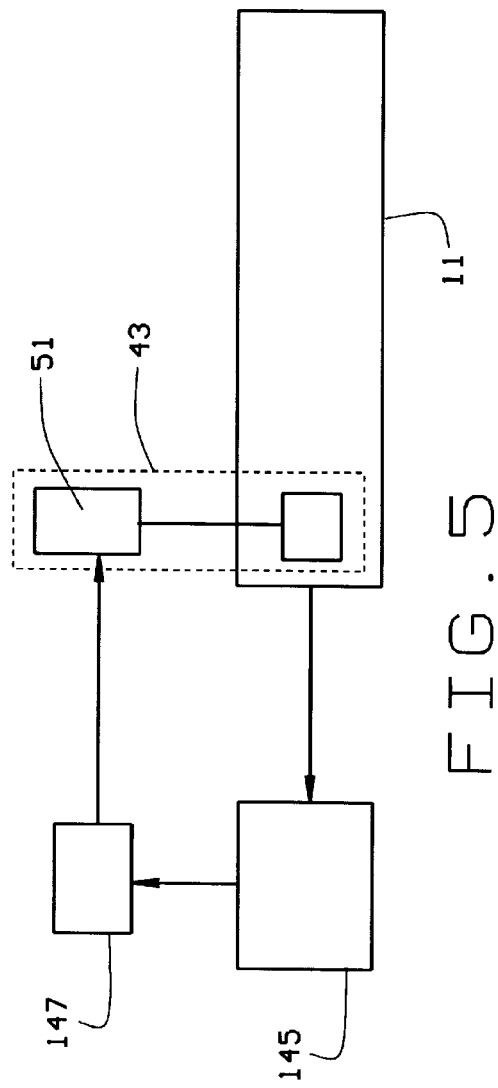

PROCESS FOR MECHANICALLY CONTROLLING THE BULK DENSITY OF AN EXTRUDED FOOD MATERIAL

BACKGROUND OF THE INVENTION

The present invention provides a method and an apparatus for extruding an extrudate with a controlled bulk density. In particular, the present invention provides an extruder with a variable restriction element which can be used to control the bulk density of the extrudate as the extrudate is extruded from the extruder, and a process of controlling the bulk density of an extrudate with a variable restriction element.

Extruders are commonly used to extrude thermoplastic materials such as plastics and moisturized feedstuffs formed of farinaceous and proteinaceous materials. The extruder heats and pressurizes the thermoplastic material and forces the material through an extruder die, whereupon the extruded material is cut into a desired shape as it exits the extruder die. For example, in the formation of dry kibbled pet foods a mixture of farinaceous and proteinaceous material is mixed with water, plasticized, and cooked as it is pushed through the extruder under pressure, and is subsequently cut into kibbles as it is extruded through the extruder die.

Maintenance of an extrudate having a constant bulk density is important to maintain consistent product size and package weights in the production of extruded foods. A common method to maintain the bulk density of extruded foodstuffs at constant levels is to adjust the moisture content of the material being extruded, which varies the inherent lubricity of the extrudate. The bulk density of the extrudate may be increased by increasing the moisture content of the material being extruded since higher levels of moisture reduce the energy imparted to the extrudate by the extruder screw, reducing expansion of the extrudate. Inversely, decreasing the moisture content of the material being extruded increases the expansion of the extrudate which decreases the bulk density of the extrudate. Moisture levels in the material can be controlled by adding steam or water to the material prior to extrusion, or injecting steam or water into the material as is passes through the extruder.

Use of the moisture content of the extruded material to control the bulk density of the extrudate subsequent to extrusion introduces variability into the quality of the final food product. Typically, an extrudate is dried in a dryer after being extruded though the die and cut to the desired size. Extrudate containing different levels of moisture will dry to an extent dependent on the amount of moisture in the extrudate when the extrudate is dried for a set period of time in a dryer. Extrudates containing relatively little moisture will tend to be burnt by the drying process, and extrudates containing excessive moisture will not completely dry, leading to a food product susceptible to mold.

In large scale commercial applications several extruders are often serviced by one dryer, and the variations in moisture levels of different extrudates entering the dryer can be large, resulting in great variation in the product exiting the dryer. The ultimate quality of the product may be adversely affected by these variations. For example, a burnt pet food kibble may not be palatable to the pet for which it is intended, and a moist pet food kibble may be unacceptable because of mold spoilage.

A recently published article authored by S. Shonauer and R. Moreira entitled *A Variable Restrictive Valve as an Extra Independent Control Variable For Food Extrusion Processes* (Food Science and Technology International, Vol. 2, pp. 241–48 (1996)) discloses the use of a restriction valve located in the die of an extruder extending across the die outlet orifice as a method of controlling the bulk density of a food extrudate without changing the moisture content of the extrudate. At relatively closed restriction valve positions the bulk density of the extrudate is low since the extrudate expands significantly as it exits the restricted die orifice under pressure from the extruder screw. At relatively open restriction valve positions the bulk density of the extrudate is high since little expansion occurs as the extrudate exits the die orifice.

The die restriction valve of Shonauer and Moreira, while permitting control of the bulk density of an extruded product, causes variations in the extruded product as the valve is positioned at various levels of restriction. Throttling the die restriction valve changes the die geometry and produces a thinner extrudate. For production of extruded foods having uniform characteristics, use of a die restriction valve is not particularly desirable since the die restriction valve causes variations in the thickness of the extrudate.

Further, Shonauer and Moreira do not suggest that a die restriction valve can be adjusted to continuously control bulk density while the extruder is in operation. In a commercial food extruding process the ability to continuously adjust the bulk density without altering the moisture level of the food in the extruder while the extruder is in operation is desirable to produce a uniform product.

SUMMARY OF THE INVENTION

The present invention is an extruder which can mechanically control the bulk density of an extrudate without altering the moisture level of the components to be extruded in the extruder, and without causing variations in the form of the extruded product. The extruder has an elongated extruder barrel which extends about and defines an extrusion chamber. An extruder die is secured at an outlet end of the extruder adjoining the extrusion chamber. The extruder die has an orifice extending therethrough through which material can be extruded which is in communication with the extrusion chamber. An adjustable flow restriction element is secured within the extruder barrel proximate to the extruder die. The adjustable flow restriction element is structured and arranged to adopt a plurality of positions restricting the downstream flow of material through the extruder, where each position of the plurality of positions is uniquely restrictive. The adjustable flow restriction element is further structured and arranged to be adjustable between each of the plurality of positions as material flows through the extruder to alter the extent which the flow restriction element restricts flow of material through the extruder. The bulk density of an extrudate extruded through the extruder is controlled by controlling the extent which the flow restriction element restricts the flow of material through the extruder.

In another aspect, the invention is a method for mechanically controlling the bulk density of an extrudate of a continuously extruded food material. A food material is continuously extruded through an extruder to form an extrudate. An overall area within the extruder through which the food material can flow and which is proximate to the extruder outlet is mechanically controlled to control the bulk density of the extrudate. In one embodiment of the invention, the bulk density of the extrudate is controlled by maintaining the bulk density at a predetermined bulk density. In another embodiment of the invention, the bulk density of the extrudate is controlled by altering the bulk density of the extrudate from a first bulk density to a second bulk density.

In still another aspect, the invention is an adjustable flow restriction element apparatus for location in an extruder proximate to the die of the extruder which is useful for mechanically controlling the bulk density level of a material continuously extruded through the extruder. The flow restriction element apparatus has a fixed component, a movable component, and means for moving the movable component relative to the fixed component. The fixed component is structured and arranged to be fixedly secured in an extruder proximate to the extruder die. The movable component is located proximate to the fixed component so the movable component and the fixed component are structured and arranged to be jointly located in the extruder across the downstream flow of material through the extruder. The movable component is movable relative to the fixed component so the movable component can adopt a plurality of positions relative to the fixed component, where each of the positions of the movable component to the fixed component is capable of uniquely restricting the downstream flow of material through the extruder in which the fixed and movable components are located.

BRIEF DESCRIPTION OF THE DRAWINGS

FIG. 1 is a schematic view of an embodiment of an extruder formed in accordance with the present invention.

FIG. 5 is a schematic view of an extruder, adjustable flow restriction element, means for measuring bulk density, and means for providing feedback.

FIG. 6 is a cross-sectional view of an extruder die housing, an extruder die, and another embodiment of an adjustable flow restriction element.

DESCRIPTION OF THE PREFERRED EMBODIMENTS

Figure 2:
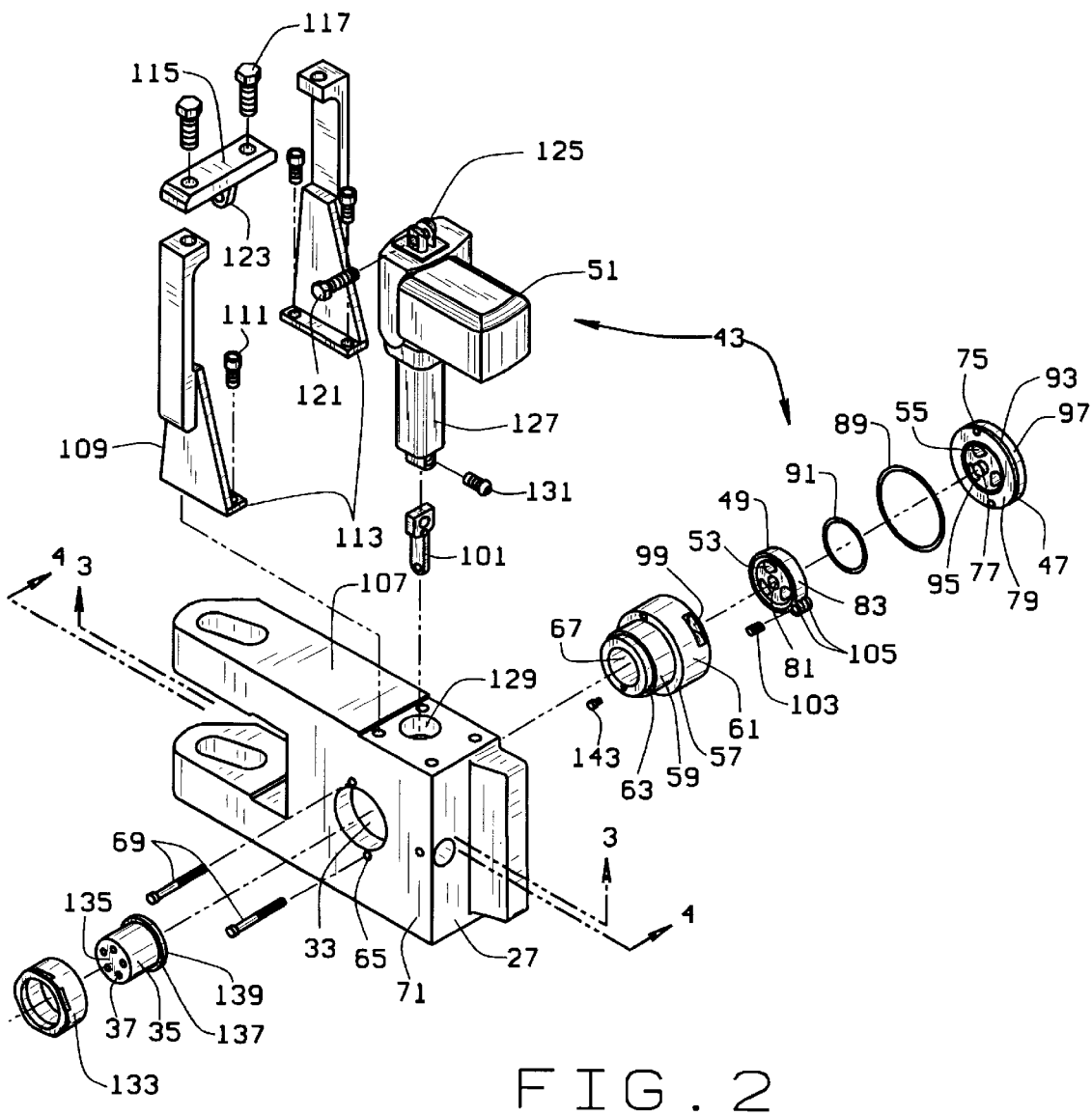
FIG. 2 is an exploded view of an extruder door including an extruder die, die housing, and a preferred embodiment of an adjustable flow restriction element formed in accordance with the present invention.

Referring now to FIG. 1, an embodiment of an extruder 11 formed in accordance with the present invention is shown. The extruder 11 has an extruder barrel 13 which extends about and encloses an extrusion chamber 15 through which a material passes as it is extruded through the extruder. An extruder screw 17 extends lengthwise through the extrusion chamber 15 in the extruder barrel 13 from an inlet end 19 of the extruder 11 for a substantial portion of the length of the extruder barrel 13. A motor (not shown) or other conventional power generator is coupled or linked to the screw 17 proximate to the inlet end 19 of the extruder 11 to provide power to rotate the screw 17. The extruder screw 17 is structured and arranged to rotate and feed material through the extruder 11 in a conventional manner. The extruder 11 may be provided with a plurality of steam or water jackets 21 for heating and cooking material passing through the extruder 11.

An inlet 23 is located in the inlet end 19 of the extruder 11 for receiving materials, preferably food materials, for extrusion through the extruder 11. Typically, food materials are moisturized and premixed in a preconditioner (not shown) which is coupled to the inlet 23 of the extruder 11 to deliver the preconditioned food material into the extruder 11. The inlet 23 communicates with the extrusion chamber 15 so material delivered through the inlet 23 is deposited in the extrusion chamber 15 positioned to be moved through the extruder 11 from the inlet end 19 to the outlet end 25 of the extruder 11 by the action of the screw 17.

An end cap 27 is removably coupled to an end plate 29 extending across the extrusion chamber 15 at the outlet end 25 of the extruder barrel 13. The end plate 29 has a centrally located aperture 31 extending therethrough which coincides with, and forms a part of, the extrusion chamber 15. The end cap 27 extends about and defines an end cap chamber 33 which aligns with the aperture 31 in the end plate 29 and the extrusion chamber 15, and forms part of the extrusion chamber 15 when the end cap 27 is coupled to the end plate 29.

In a preferred embodiment, the end cap 27 is an extruder door, and henceforth will be referred to as an extruder door. The extruder door 27 is structured to be securely fastened to the end plate 29 so as to form a pressure fluid seal capable of withstanding the high pressures generated within the extrusion chamber 15 during extrusion. In one embodiment, the extruder door 27 may be bolted to the end plate 29. In a preferred embodiment, the extruder door 27 is hingedly coupled to the end plate 29 and may be removably latched to the end plate 29, as described in U.S. Pat. No. 3,561,371 to Kummer, which is incorporated herein by reference.

An extruder die 35 is secured at the outlet end 25 of the extruder 11 adjoining the extrusion chamber 15. Preferably, the extruder die 35 is coupled to the extruder door 27 in communication with the extruder door chamber 33 portion of the extrusion chamber 15. The extruder die 35 may be removably coupled to the extruder door 27 so that the extruder die 35 may be interchanged with other extruder dies. In a particularly preferred embodiment, the extruder die 35 is threadably coupled to the extruder door 27 so the extruder die may be removed from or inserted in the extruder 11 by unscrewing or screwing the extruder die 35.

The extruder die 35 has at least one orifice 37 extending therethrough in communication with the extrusion chamber 15 through which material passing through the extruder 11 may be extruded. The extruder die 35 is positioned in the extruder 11 with an inlet end 39 of each orifice 37 adjoining and in communication with the extruder door chamber 33, and an outlet end 41 of each orifice 37 located at the outlet end 25 of the extruder. An extruder knife (not shown) is located spaced slightly apart from the outlet end of the orifices 37 positioned to cut material extruded through the die orifices 37 into desirable lengths of extrudate as the material exits the die 35. In a particularly preferred embodiment, the extruder knife is positioned to cut extruded food material into kibbles as the extrudate exits the die, where the kibbles may be used as a pet food material.

In a preferred embodiment, the extruder die 35 may be selected from a plurality of dies having different orifice configurations and characteristics. The cross-sectional shape, diameter, and number of orifices 37 in the die 35 are important in determining the shape of the extrudate extruded from the die and the rate at which material can be extruded from the extruder. The extruder die 35 having the desired orifice 37 characteristics to best produce the desired extruded product may be selected from the plurality of dies.

An adjustable flow restriction element 43 is located in the extruder 11 in the extrusion chamber 15 between the tip 45 of the screw 17 and the extruder die 35 for mechanically controlling the bulk density of material extruded from the extruder. In a preferred embodiment, the adjustable flow restriction element 43 is secured in the extruder door 27 located in the extruder door chamber 33 portion of the extrusion chamber 15 in a position to be adjusted to partially block the downstream flow of material through the extrusion chamber 15.

The adjustable flow restriction element 43 can control the bulk density of a material extruded from the extruder 11 by adjustably restricting the flow of the material in the extruder near the extruder die 35, and thereby controlling the degree of expansion and bulk density of the material extruded through the die 35. The adjustable flow restriction element 43 is structured and arranged in the extruder to adopt a plurality of positions which can restrict the downstream flow of material through the extruder 11 from the screw 17 to the die 35. Each position of the plurality of positions can uniquely restrict the downstream flow of material through the extruder 11 by uniquely determining the overall area through which the extruded material may flow through the flow restriction element 43. The adjustable flow restriction element 43 is further structured and arranged in the extruder 11 to be adjustable between each position of the plurality of uniquely restrictive positions as material flows through the extruder so the flow restriction element 43 can alter the extent of flow restriction to change the bulk density of the extruded material as the material is continuously extruded.

Preferably, the flow restriction element 43 can adopt several positions which, as a group, enable the flow restriction element 43 to be adjusted to restrict the flow of material through the flow restriction element 43 as much or as little as desired. For example, in a preferred embodiment of the invention, the flow restriction element 43 may be adjusted from a position in which the flow restriction element 43 does not restrict the flow of material through the extrusion chamber 15 at all, to a position in which the flow restriction element substantially restricts the flow of material through the extrusion chamber. In a most preferred embodiment, the adjustable flow restriction element 43 can adopt a position and be adjusted between positions in a continuum of uniquely flow restrictive positions.

The adjustable flow restriction element 43 includes means for adjusting the flow restriction element 43 so the flow restriction element may be adjusted between uniquely restrictive positions to change the bulk density of the extrudate. In a preferred embodiment, the means for adjusting the flow restriction element 43 is located external to the extruder 11 so the flow restriction element may be adjusted while the extruder is in operation without having to stop and open the extruder.

Figure 3:
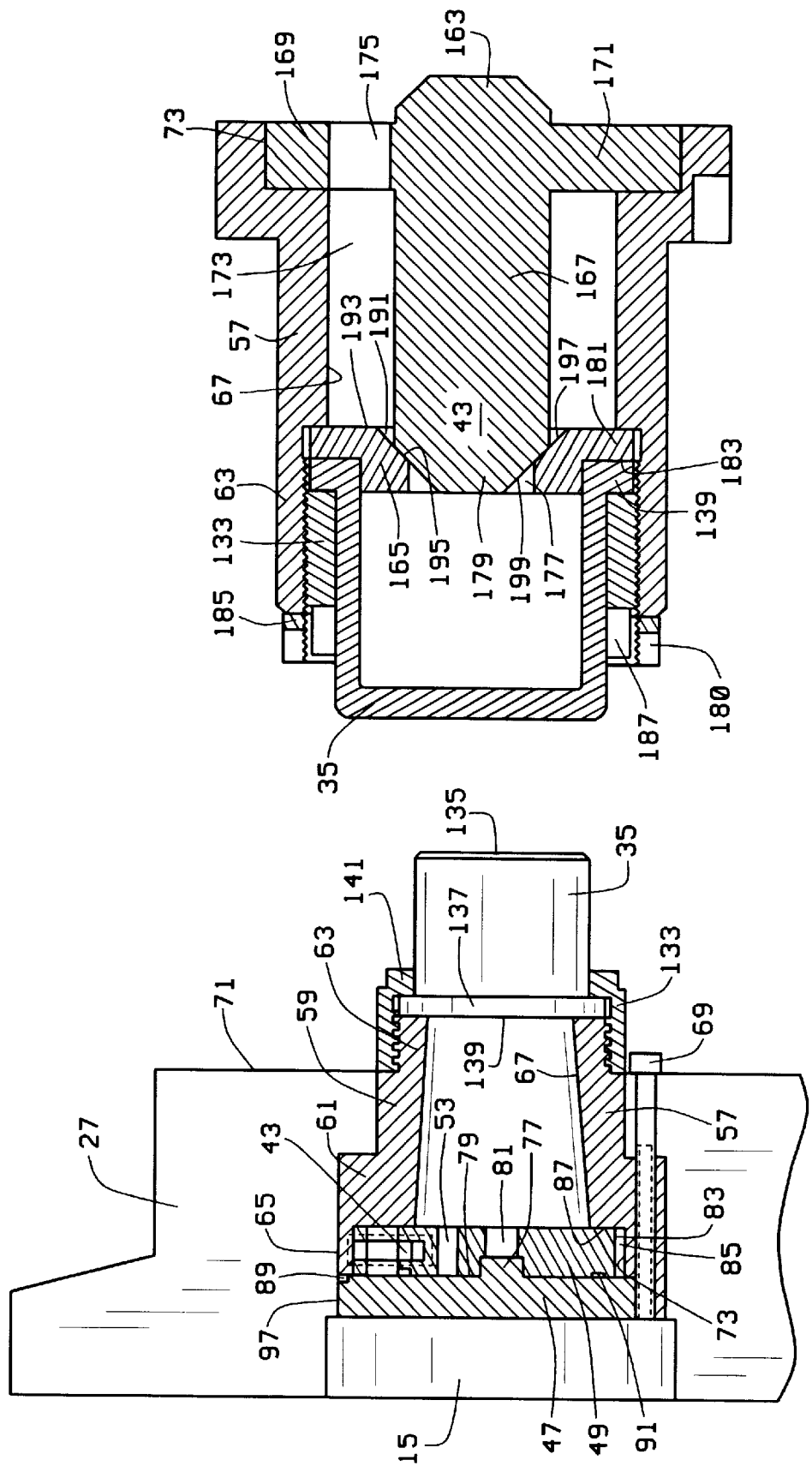
FIG. 3 is a cross-sectional view of the extruder door, extruder die, die housing, and adjustable flow restriction element of FIG. 2 viewed along the lines A–A'.
Figure 4:
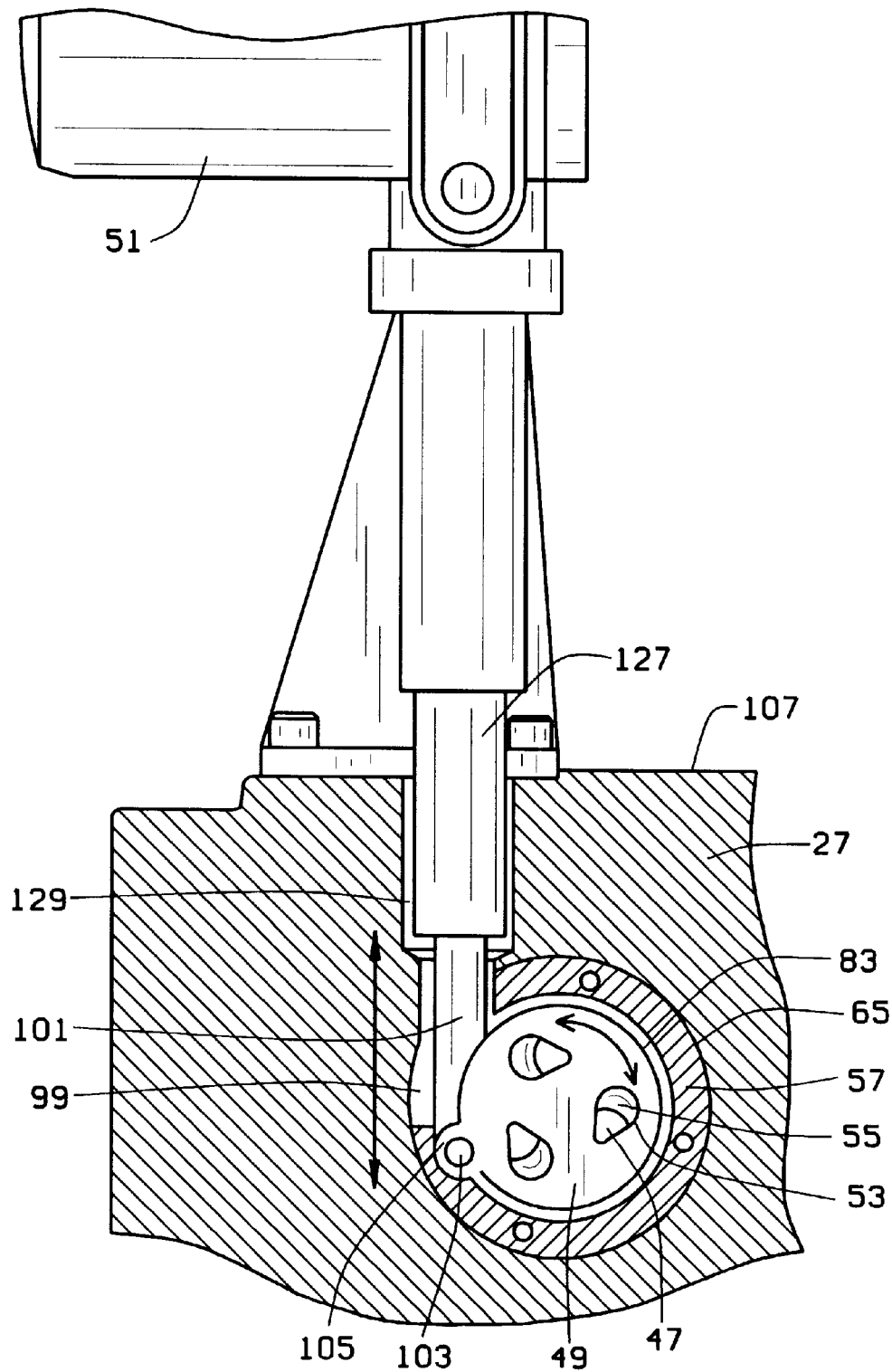
FIG. 4 is a cross-sectional view of the extruder door, die housing, and adjustable flow restriction element of FIG. 2 viewed along the lines B–B'.

Referring now to FIGS. 2 and 3, a preferred embodiment of the adjustable flow restriction element 43 is shown. The adjustable flow restriction element 43 is formed of a cylindrical fixed plate component 47, a cylindrical movable plate component 49 located abutting the fixed plate 47 which is rotatable relative to the fixed plate 47, and an actuator 51 for rotating the movable plate 49 relative to the fixed plate 47. As shown in FIG. 1, the fixed plate 47 and the movable plate 49 are jointly located in the extruder 11 between the tip 45 of the screw 17 and the die 35 positioned across the downstream flow of material through the extruder 11. Referring back to FIG. 2, the movable plate 49 and the fixed plate 47 have apertures 53 and 55, respectively, extending therethrough which are aligned with the downstream flow of material through the extruder 11. As shown in FIG. 4, the actuator 51 is coupled to the movable plate 49 so the actuator 51 can rotate the movable plate 49 relative to the fixed plate 47 from a position in which each aperture 53 in the movable plate 49 minimally overlaps a respective aperture 55 in the fixed plate 47 through a series of unique relative aperture positions to a position in which each aperture 53 in the movable plate 49 is fully aligned with a respective aperture in the fixed plate 47. The extent which the flow restriction element 43 restricts the flow of material through the extruder can be controlled by adjusting the actuator 51 to position the movable plate 49 to set the apertures 53 and 55 at a desired degree of overlap.

Referring again to FIGS. 2 and 3, the fixed and movable plates 47 and 49 of the adjustable flow restriction element 43 and the extruder die 35 are secured in the extrusion chamber 15 by a die housing 57 which is secured in the extruder door 27. The die housing 57 is a cylindrical sleeve having a central portion 59, a flanged end section 61, and a threaded end section 63. The die housing 57 is positioned in the bore 65 which defines the extruder door chamber 33, with the bore 67 of the die housing coaxially aligned with the extruder door bore 65 to permit passage of extruded material through the bore 67 of the die housing. Die housing bolts 69 extend through the outer face 71 of the extruder door 27 to secure the die housing 57 in the door 27.

Referring now specifically to FIG. 3, the die housing 57 holds the movable and fixed plates 47 and 49 in position to extend across the downstream flow of material through the extruder. The die housing bore 67 has a counterbore 73 located in the flanged end section 61 of the die housing 57 which receives and holds the movable plate 49 positioned across the downstream flow of material through the extruder. As shown in FIG. 2, die housing bolts 69 extend through the die housing 57 and into threaded bolt holes 75 in the fixed plate 47 to secure the fixed plate against the flanged end section 61 of the die housing 57.

Referring again to both FIGS. 2 and 3, the movable plate 49 is held in the counterbore 73 abutting the fixed plate 47 so the movable plate 49 can freely rotate but cannot move linearly in the direction of the flow of material through the extruder. An axle 77 extends axially from the face 79 of the fixed plate 47 adjacent to the movable plate 49. A central aperture 81 of the movable plate 49 extends over the axle 77 of the fixed plate 47 so the movable plate 49 may rotate relative to the fixed plate 47 about the axle 77. As shown in FIG. 3, the outer edge 83 of the movable plate 49 is spaced slightly apart from the counterbore 73 by a gap 85 to permit the movable plate 49 to rotate freely in the counterbore 73 about the axle 77. The movable plate 49 is secured in the counterbore 73 by the abutting fixed plate 47 and a shoulder 87 formed by the counterbore 73. The fixed plate 47 and the shoulder 87 cooperatively prevent linear movement by the moveable plate 49.

Referring again to both FIGS. 2 and 3, compressible O-rings 89 and 91 are provided to prevent material from seeping between the fixed and movable plates 47 and 49 as the material is extruded under pressure, thereby maintaining the rotatability of the movable plate 49. O-ring 89 is located in a groove 93 which extends about the circumference of the fixed plate 49, and forms a seal between the flanged end section 61 of the die housing 57, the extruder door bore 65, and the fixed plate 47. O-ring 89 prevents material being extruded from passing between the flanged end section 61 of the die housing 59, the extruder door bore 65, and the fixed plate 47 into the gap 85 between the counterbore 73 and the movable plate 49.

O-ring 91 is located in a circular groove 95 in the face 79 of the fixed plate 47 which abuts the movable plate 49. The groove 95 is positioned between the outer edge 97 of the fixed plate 47 and the apertures 55 in the fixed plate. The O-ring 91 forms a seal between the movable plate 49 and the fixed plate 47 about the apertures 53 and 55 in the plates 47 and 49, preventing material being extruded from seeping from the apertures 53 and 55 between the fixed and movable plates 47 and 49 into the gap 85.

Referring now to FIG. 2, the actuator 51 is coupled to the movable plate 49 through a slot 99 in the die housing 57 so the actuator can rotate the movable plate 49. Preferably the actuator 51 is a linear actuator which has an extension 101 that is coupled with a pin 103 to pin receptacles 105 formed in the movable plate 49 at the outer edge 83 of the movable plate 49. The linear actuator 51 can move the extension 101 parallel to a line tangential to the edge 83 of the movable plate 49 to cause the movable plate to rotate. In a preferred embodiment the actuator 51 is a conventional linear actuator which is commercially available. For example, a preferred linear actuator is Magnetic Model Max 31 Linear Actuator available from Magnetic Corp. Olney, Ill.

The actuator 51 is preferably positioned over the extruder door 27 extending through the top 107 of the extruder door 27 with its extension 101 passing through the die housing 57 to the pin receptacles 105. An actuator support 109 is secured to the top 107 of the extruder door 27 with actuator support bolts 11. The actuator support 109 has two legs 113 which extend upwards from the extruder door, across which a support crossbar 115 is secured with crossbar bolts 117. The actuator 51 is suspended from the support crossbar 115 by a bolt 121 which couples a crossbar suspension bolt receptacle 123 extending from the bottom of the crossbar to suspension bolt receptacles 125 extending from the top of the actuator 51.

As shown in FIG. 4, a downwardly extending arm 127 is coupled to the actuator 51 positioned to extend through an actuator opening 129 in the extruder door 27. The actuator opening 129 extends transversely from the top 107 of the extruder door 27 to the extruder door bore 65 offset from the center of the extruder door bore 65. The actuator arm 127 extends through the actuator opening 129 to the extension 101 which is coupled to the arm 127 with an extension bolt 131 (shown in FIG. 2). The extension 101 extends from the arm 127 through the slot 99 in the die housing 57 to be coupled to the pin receptacles 105 of the movable plate 49.

Upon activation, the actuator 51 moves the extension 101 linearly in a direction tangential to the outer edge 83 of the movable plate 49. The movement of the extension 101 causes the movable plate 49 coupled to the extension 101 to rotate in a direction dictated by the movement of the extension 101. Rotation of the movable plate 49 changes the total area of overlap between the apertures 53 of the movable plate 49 and the apertures 55 of the fixed plate 47 by moving the apertures 53 of the movable plate 49 relative to the apertures 55 of the fixed plate 47. Restriction of the flow of material through the fixed and movable plates 47 and 49 may be increased or decreased by causing the actuator 51 to rotate the movable plate 49 in an appropriate direction to increase or decrease the overlapping area of the apertures 53 and 55.

Preferably, the apertures 53 and 55 are shaped so that the amount of overlap between the apertures 53 and 55 may be gradually increased or decreased by movement of the movable plate 49 relative to the fixed plate 47. In one embodiment of the invention, the apertures 53 and 55 have a wedge-shape cross-section. In a more preferred embodiment of the invention, the apertures 53 and 55 have a teardrop-shape cross-section.

Referring again to FIGS. 2 and 3, the extruder die 35 is located and removably secured in the threaded end section 63 of the die housing 57 by a die nut 133 threadably coupled to the threaded end section 63 of the die housing. The die 35 is a cylindrical sleeve having an end wall 135 through which the die orifice(s) 37 extend and a flange 137 at a flange end 139 of the die 35 which is opposite from the end wall 135. The die 35 is positioned with the flange end 139 abutting the threaded end section 63 of the die housing 57 with the die nut 133 threadably coupled to the threaded end section 63 of the die housing and gripping the flange 137 of the die 35 with a lip 141 to secure the die 35 in the die housing 57. In a preferred embodiment, the die 35 is properly positioned in the die housing bore 67 with a locator pin 143 extending from the threaded end section 63 of the housing 57 which is received in a groove (not shown) in the die 35.

The die 35 may be removed from the die housing 57 by unscrewing the die nut 133 from the threaded end section 63, and a new die may be secured in the die housing 57 by locating the flange end 139 of the new die 35 against the threaded end section 63 of the die housing 57 and screwing the die nut 133 onto the threaded end section 63 so the lip 141 grips the flange 137 of the new die.

In a particularly preferred embodiment of the invention, shown schematically in FIG. 5, means for measuring the bulk density 145 of material extruded from the extruder is positioned to receive and measure the bulk density of a portion of the material extruded from the extruder 11. Preferably, the means for measuring the bulk density is a conventional, commercially available device such as an apparatus for weighing a constant volume of material. For example, the means for measuring the bulk density may be a sample collecting container such as a bucket, a can, or a beaker which is periodically dipped in the stream of extruded material after the material is cut by the extruder knife, a scraper which scrapes across the top of the sample collecting container to level the extruded material in the sample collecting container to bring the material in the sample collecting container to a fixed volume, and a scale for weighing the sample collecting container containing a fixed volume of the extruded material. Most preferably, the means for measuring bulk density 145 is capable of automatically measuring the bulk density of material extruded from the extruder at set intervals of time.

The means for measuring the bulk density 145 is communicatively coupled to means for providing feedback 147 from the means for measuring the bulk density 145 to the actuator 51 (or other means for moving the movable component of the flow restriction element 43). The means for providing feedback 147 may be any means capable of transmitting the measured bulk density from the means for measuring the bulk density 145 to the actuator 51, including mere wiring, or any means of electronically or mechanically transferring the measured bulk density data. In a preferred embodiment, the means for providing feedback 147 is a data processing system which is communicatively coupled between the means for measuring the bulk density 145 and the actuator 51, and has a memory for storing and displaying a series of bulk density measurements from said means for measuring the bulk density 145. Most preferably, the means for providing feedback 147 automatically provides feedback from the means for measuring bulk density 145 to the actuator 51 (or other means for moving the movable component of the flow restriction element) each time the means for measuring bulk density 145 automatically measures the bulk density of an extrudate.

In a most preferred embodiment, the actuator 51, or other means for moving the movable component of the flow restriction element 43, is structured and arranged to automatically move the movable component of the flow restriction element 43 relative to the fixed component of the flow restriction element in response to bulk density feedback provided by the means for providing feedback 147 from the means for measuring bulk density 145. For example, the linear actuator 51 described above may automatically move the movable plate 49 relative to the fixed plate 47 in response to bulk density input from a data processing system, where the data processing system receives the bulk density data from a means for measuring bulk density.

In another embodiment of the invention, as shown in FIG. 6, a cross-sectional view of a die housing 57, a die 35, and a piston-valve like embodiment of the adjustable flow restriction element 43 is shown. The die housing 57 and the die 35 may be located in the extruder by being secured in the extruder door as described above with respect to the previous embodiment. The adjustable flow restriction element 43 has a fixed component 163 and a movable component 165 which cooperatively can be adjusted to restrict the flow of material through the die housing 57 and the extruder in which the die housing is located.

The fixed component 163 has a substantially cylindrical rod portion 167 and an annular ring portion 169 extending about the rod portion 167 and being coupled to the rod portion 167 with spokes 171 which extend radially from the rod portion 167 to the ring portion 169. The ring portion 169 of the fixed component 163 is located in the counterbore 73 of the die housing 57 with the rod portion 167 extending coaxially partway through the bore 67 of the die housing 57. A flow channel 173 through which material may flow through the die housing 57 extends about the rod portion 167 in the die housing between the rod portion 167 and the bore 67 of the die housing.

The spokes 171 support and hold the rod portion 167 in its coaxial position in the die housing bore 67 when the ring portion 169 is located in the counterbore 73. Flow apertures 175 are located between the spokes 171 so material may flow between the rod portion 167 of the fixed component and the ring portion 169 into the flow channels 173. Preferably, the fixed component has three spokes 171 located at 120° angles relative to each other about the rod portion 167.

The movable component 165 is an annular ring which has a central aperture 177 through which extruded material may flow and which may be positioned to receive a flow blocking end 179 of the rod portion 167 of the fixed component 163. The annular ring of the movable component 165 also has a lip 181 which forms a shoulder 183 which the flange end 139 of the die 35 abuts. The die nut 133 threadably couples the threaded end section 63 of the die housing 57 to secure the die 35 and the movable component 165 in the die housing 63. A locking ring 185 is threadably coupled to the die nut 133 to prevent the die nut 133 from unscrewing from about the threaded end section 63 of the die housing 57 under the pressure exerted as material is extruded through the die housing 57.

The movable component 165 may be moved linearly relative to the flow blocking end 179 of the rod portion 167 to adjust the degree that the flow blocking end 179 is located in the central aperture 177 of the movable component 165, thereby adjusting the degree which the flow restriction element 43 blocks the flow of material through the extruder. The movable component 165 is moved by screwing or unscrewing the die nut 133 about the threaded end section 63 of the die housing 57 to move the die 35 towards or away from, respectively, the fixed component 163. Slots 187 and 189 are provided in the die nut 133 and the locking ring 185, respectively, so that a spanner wrench may be inserted into the slots 187 and 189 to enhance the ease of screwing or unscrewing the die nut 133 about the threaded end section 63.

As the die nut 133 is screwed further into the threaded end section 63 of the die housing 57, the die 35 and the movable component 165 are moved toward the flow blocking end 179 of the rod portion 167 of the fixed component 163, and the flow of material through the fixed and movable components 163 and 165 is increasingly restricted. As the die nut 133 is unscrewed about the threaded end section 63 of the die housing 57, the die 35 and movable component 165 are moved away from the flow blocking end 179 of the rod portion 167, and the flow of material through the fixed and movable components 163 and 165 is decreasingly restricted. The die 35 and the movable component 165 are moved away from the flow blocking end 179 of the rod portion 167 by pressure from the material being extruded when the die nut 133 is unscrewed.

Preferably the central aperture 177 in the movable component 165 and the flow blocking end 179 of the rod portion 167 of the fixed component 163 are structured to be mated together so the flow of material through the central aperture 177 will incrementally increase as the movable component 165 is moved away from the fixed component 163. In a preferred embodiment, the flow blocking end 179 is frusto-conically shaped, and the central aperture 177 has a flared section 191 facing the fixed component 163 which matingly receives the frusto-conical flow blocking end 179 of the rod portion 167. Most preferably, the diameter of the flared section 191 of the central aperture 177 is wider than the diameter of the rod portion 167 at the face 193 of the movable component 165 which faces the fixed component 163, and is narrower than the diameter of rod portion 167 at the neck 195 of the flared section 191, enabling the frusto-conical flow blocking end 179 of the rod to matingly fit in a portion of the flared section 191. As the movable component 165 is moved relative to the fixed component 163 the edges 197 and 199 of the flared section 191 and the flow blocking end 179, respectively, gradually separate, thereby gradually increasing or decreasing the extent the flow restriction element 43 restricts the flow of material therethrough.

The embodiments of the adjustable flow restriction element 43 described above are the preferred embodiments of the flow restriction element 43, however, the invention is not intended to be limited to these embodiments. The adjustable flow restriction element 43 may be any apparatus which may be located in an extruder near the die of the extruder and which may be structured and arranged to adopt a plurality of positions which restrict the downstream flow of material through the extruder, where each position of the plurality of positions is uniquely restrictive, and where the flow restriction element is structured and arranged to be adjustable between each of the plurality of positions as material flows through the extruder. For example, the adjustable flow restriction element may be a sluice gate capable of assuming a number of positions partially extending across the extruder chamber.

The adjustable flow restriction element 43 may also be one of several different types of valves seated in the extruder near the extruder die positioned to restrict the flow of material through the extruder chamber. For example, the adjustable flow restriction element may be a piston valve, a globe valve, or a check valve. Typically the valve will have a valve seat, a valve stopcock which is movable relative to the valve seat to assume a plurality of unique flow restrictive positions, and a means for moving the valve stopcock relative to the valve seat to adjust the valve stopcock between the plurality of unique flow restrictive positions.

Referring again to FIG. 1, to control the bulk density of an extruded food material in accordance with the process of the present invention, a food material mixture to be extruded is continuously fed into the inlet 23 of an extruder 11 having an adjustable flow restriction element 43 located therein, and is continuously extruded through the extruder 11 to form an extrudate. The food material mixture may include farinaceous and proteinaceous materials, as well as other desired ingredients, and may be preconditioned and moisturized with steam and water before being placed in the extruder.

After being deposited in the extruder 11 through the extruder inlet 23, the extruder screw(s) 17 advance the food mixture mass through the extruder 11 towards the adjustable flow restriction element 43 and the extruder die 35 while providing shear and pressure to the food mixture. Heat may be supplied by the steam jackets 21 to the extruder barrel 13 to cook the food mixture as it proceeds through the extruder 11. The food material mixture is plasticized into a flowable mass by the combination of shear, temperature, and pressure as it proceeds through the extruder 11.

As the food material mixture is advanced through the extruder 11 the flow restriction element 43 blocks the flow of the food mixture through the extruder to the extent that the flow restriction element is positioned to restrict an area in the extrusion chamber 15 through which the food material mixture may flow. The level of energy imparted to the food material by the extruder screw 17 directly corresponds to the degree of restriction of the area by the flow restriction element 43 through which the food material may flow.

The extent of expansion of the extruded food material, and therefore the bulk density of the extrudate, is determined in part by the level material imparted to the food material by the extruder screw. Elevated levels of energy imparted to the food material by the screw as a result of a relatively greater degree of restriction of food material flow through the extruder cause the food material to expand more upon extrusion than relatively lower levels of energy imparted to the food material when the flow of food material through the extruder is relatively less restricted. A relatively unexpanded food material extrudate has a greater bulk density than a food material extrudate which is significantly expanded.

The bulk density of the extrudate, therefore, is controlled by mechanically controlling the overall area in the extruder proximate to the extruder outlet or extruder die 35 through which the food material mixture can flow with the adjustable flow restriction element 43. The overall area in the extruder proximate to the extruder outlet or extruder die 35 may be increased or decreased by adjusting the flow restriction element 43 to increase or decrease the bulk density of the extrudate. Preferably the adjustable flow restriction element 43 can be used to mechanically control the overall area by mechanically controlling the area of an aperture through which the food material mixture can flow through the extruder.

After flowing through the adjustable flow restriction element 43, the food material mixture enters the extrusion chamber between the flow restriction element 43 and the die 35 where it collects prior to extrusion through a die orifice 37. The food material mixture is then extruded through a die orifice 37 under pressure from further food material entering the extrusion chamber between the adjustable flow restriction element 43 and the die 35 to produce an extrudate, which is cut to a desired size with a cutting blade (not shown). The extrudate is not particularly subject to variations in diameter, length, or width since restriction for the purpose of controlling the bulk density of the extrudate occurs prior to being extruded through the die 35.

In a preferred embodiment of the present invention, samples of the cut extrudate are periodically measured to determine the bulk density of the extrudate by periodically weighing a constant volume of the cut extrudate. Preferably, constant volume samples of the cut extrudate are collected in a sample collecting container large enough to collect a sample of reproducible volume. Each constant volume sample is weighed to determine the bulk density of the extruded material. Most preferably, the samples of extrudate are automatically collected, and the bulk density of the collected samples is automatically measured.

Using the measured bulk density of the samples, the bulk density of the extrudate can be controlled by adjusting the adjustable flow restriction element 43. In one embodiment of the invention, the bulk density of the extrudate is controlled by utilizing the flow restriction element 43 to maintain the bulk density of the extrudate at a predetermined level of bulk density while maintaining a fixed formulation of continuously extruded food material. A fixed formulation of food material may have inherent bulk density variations as the food material is extruded through the extruder 11, and the flow restriction element 43 may be used to mechanically adjust the overall area in the extruder proximate to the die 3 5 through which the food material may flow to compensate for these variations and maintain the bulk density of the extrudate at a predetermined level.

To maintain the bulk density level of an extruded food material at a predetermined bulk density level, the food material is continuously extruded through the extruder 11 to form an extrudate, and the bulk density level of the extruded food material is measured, preferably automatically. The measured level of bulk density of the extruded food material is compared with the predetermined bulk density level to determine whether the measured bulk density level is substantially equivalent to the predetermined bulk density level, again, preferably automatically. The overall area in the extruder proximate to the die 35 is then mechanically adjusted with the flow restriction element 43 until the measured level of bulk density of the extruded food material is substantially equivalent to the predetermined level of bulk density, provided the measured level of bulk density is not already substantially equivalent to the predetermined level of bulk density. These steps are preferably repeated at frequent intervals to ensure that the extruded food material remains at the desired predetermined level of bulk density.

In another embodiment, the bulk density of the extrudate of a continuously extruded food material is controlled by utilizing the flow restriction element 43 to alter the bulk density level by increasing or decreasing the bulk density level of the extrudate from a first bulk density level to a second bulk density level. As the food material is continuously extruded through the extruder 11 to form an extrudate, the overall area in the extruder proximate to the die 35 is mechanically adjusted with the flow restriction element 43 to alter the bulk density level of the extrudate from the first bulk density level. The overall area is adjusted with the flow restriction element so the bulk density level changes from the first bulk density level towards the desired second bulk density level, for example, the overall area may be decreased with the flow restriction element 43 if the desired second bulk density level is less than the first bulk density level.

The resulting level of bulk density of the extruded food material caused by adjusting the overall area in the extruder proximate to the die with the flow restriction element 43 is measured, preferably automatically, to determine the effect of the change of the overall area on the bulk density level. The measured resulting bulk density level of the extrudate is then compared with the desired second bulk density level to determine if the measured resulting bulk density level is substantially equivalent to the desired second bulk density level, again, preferably automatically. The overall area in the extruder proximate to the die is then mechanically adjusted with the flow restriction element 43 to change the bulk density level of the extrudate from the measured resulting bulk density to the second bulk density level, provided that the measured resulting bulk density level is not already substantially equivalent to the second bulk density level. The steps of measuring the resulting bulk density level, and adjusting the overall area with the flow restriction element 43 are repeated until the measured resulting bulk density level is substantially equivalent to the second bulk density level.

It will be appreciated by those skilled in the art that various changes may be made in the invention as disclosed without departing from the spirit of the invention. The invention is not to be the specifics of the disclosed embodiments, but rather is to be limited only by the scope of the appended claims and their equivalents.

What is claimed is:

1. A process for mechanically controlling the bulk density of an extrudate of a continuously extruded food material, comprising:

continuously extruding a food material through an extruder outlet to form an extrudate of generally uniform predetermined shape, and mechanically controlling an overall area within said extruder proximate to said extruder outlet through which said food material can flow through said extruder to control the bulk density of said extrudate while maintaining the shape.

2. The process of claim 1 wherein mechanically controlling said overall area within said extruder through which said food material can flow comprises mechanically adjusting the area of an aperture through which food material can flow through said extruder.

3. The process of claim 1 wherein said bulk density of said extrudate is controlled by maintaining the bulk density of said extrudate at a predetermined level of bulk density while maintaining a fixed formulation of said food material.

4. The process of claim 3 wherein said bulk density of said extrudate is maintained at a predetermined level of bulk density by mechanically adjusting said overall area in said extruder through which said food material can flow in response to inherent bulk density variations in said food material being extruded.

5. The process of claim 4 wherein said overall area is mechanically adjusted in response to inherent bulk density variations in said food material being extruded by measuring level of bulk density of a sample of extruded food material, comparing the measured level of bulk density with said predetermined level of bulk density, and mechanically adjusting said overall area in said extruder through which said food material can flow until said measured level of bulk density is substantially equivalent to said predetermined level of bulk density.

6. The process of claim 1 wherein said bulk density of said extrudate is controlled by altering the level of bulk density of said extrudate from a first level of bulk density to a second level of bulk density.

7. The process of claim 6 wherein said bulk density of said extrudate is altered from a first level of bulk density to a second level of bulk density by mechanically adjusting said overall area in said extruder through which said food material can flow.

8. The process of claim 7 wherein said overall area is mechanically adjusted to alter said bulk density of said extrudate from a first level of bulk density to a second level of bulk density by mechanically adjusting said overall area to change the bulk density level of said extrudate from said first level of bulk density, measuring a resulting level of bulk density of a sample of extruded food material after mechanically adjusting said overall area, comparing the measured resulting level of bulk density with said second level of bulk density, and mechanically adjusting said overall area in said extruder through which said food material can flow until said measured resulting level of bulk density is substantially equivalent to said second level of bulk density.

9. The process of claim 8 wherein said resulting level of bulk density of said extruded food material is automatically measured, said measured resulting level of bulk density is automatically compared with said second level of bulk density, and said overall area in said extruder through which said food material can flow is automatically mechanically adjusted until said measured resulting level of bulk density is substantially equivalent to said second level of bulk density.

10. A process for mechanically controlling the bulk density of an extrudate of a continuously extruded food material, comprising:

continuously extruding a food material through an extruder outlet to form an extrudate of generally uniform predetermined shape;

mechanically controlling an overall area within said extruder proximate to said extruder outlet through which said food material can flow through said extruder to control the bulk density of said extrudate while maintaining the shape;

automatically measuring said bulk density of said extruded food material;

automatically comparing said measured level of bulk density with a predetermined level of bulk density; and automatically adjusting said overall area in said extruder through which said food material may flow until said measured level of bulk density is substantially equivalent to said predetermined level of bulk density.

11. A process for mechanically controlling the bulk density of an extrudate of a continuously extruded food material of generally uniform predetermined shape, comprising:

continuously extruding a food material through an extruder having a screw and an extruder die to form an extrudate; and mechanically adjusting a variable flow restriction element located within said extruder between a tip of the screw and the extruder die through which said food material can flow to control the bulk density of said extrudate while maintaining the shape.

* * * * *